US007760718B2

(12) United States Patent
Kamath (10) Patent No.: US 7,760,718 B2
(45) Date of Patent: Jul. 20, 2010

(54) TAXONOMY BASED MULTIPLE ANT COLONY OPTIMIZATION APPROACH FOR ROUTING IN MOBILE AD HOC NETWORKS

(75) Inventor: Krishna Y. Kamath, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 11/869,181

(22) Filed: Oct. 9, 2007

(65) Prior Publication Data

US 2009/0052321 A1 Feb. 26, 2009

(30) Foreign Application Priority Data

Aug. 20, 2007 (IN) .................................. 1769/2007

(51) Int. Cl.
*H04L 12/56* (2006.01)
(52) U.S. Cl. ...................... 370/386; 370/238; 370/328; 370/349
(58) Field of Classification Search ................. 370/238, 370/252, 328, 349, 338, 474
See application file for complete search history.

(56) References Cited

U.S. PATENT DOCUMENTS

| 6,985,476 B1 * | 1/2006 | Elliott et al. ................ 370/349 |
| 2005/0053007 A1 * | 3/2005 | Bernhardt et al. ........... 370/238 |
| 2005/0286464 A1 * | 12/2005 | Saadawi et al. ............. 370/328 |

OTHER PUBLICATIONS

Zhang, Linifang, et al., "Load balancing of multipath source routing in ad hoc networks", IEEE, vol. 5, May 2002, Digital Object Identifier 10.1109/ICC.2002.997425, 5 pages.

Li, Yang, et al., "Three load metrics for routing in ad hoc networks", IEEE, vol. 4, Sep. 2004, Digital Object Identifier 10.1109/VETECF.2004.1400561, 5 pages.

Mong Sim, Kwang, et al, "Multiple ant-colony optimization for network routing", IEEE, Cyber worlds, 2002, Proceedings First International Symposium, Nov. 2002, Digital Object Identifier 10.1109/CW.2002.1180890, 5 pages.

(Continued)

*Primary Examiner*—Dang T Ton
*Assistant Examiner*—Mohamed Kamara
(74) *Attorney, Agent, or Firm*—Hickman Palermo Truong & Becker LLP (57) ABSTRACT

In one embodiment, an apparatus comprises route management logic. The logic is operable to send a plurality of forward-route packets over a route to a destination node in a mobile ad hoc network. Each one of the plurality of forward-route packets is assigned to a different class of a plurality of classes. While traversing the route to the destination node, a forward-route packet accumulates a network metric that is associated with that class of the plurality of classes to which the forward-route packet is assigned. The logic is operable to receive from the destination node a plurality of backward-route packets. Each of the plurality of backward-route packets corresponds to one of the plurality of forward-route packets, and includes a network metric that is accumulated by the corresponding forward-route packet. The logic is operable to retrieve the network metrics from each of the plurality of backward-route packets and, based on the retrieved network metrics, to compute and store a probability value that is associated with the route to the destination node.

26 Claims, 3 Drawing Sheets

OTHER PUBLICATIONS

Dorigo, Marco, et al., "Ant Algorithms for Discrete Optimization", Artificial Life, MIT Press, 1999, 36 pages.

Dorigo, Marco, et al., "Ant System—An Autocatalytic Optimizing Process", Technical Report IRIDIA/ 1991-016, 1991, Italy: Politecnico di Milano, 21 pages.

Dorigo, Marco, et al., "The Ant System—Optimization by a colony of cooperating agents", IEEE Transactions on Systems, Man, and Cybernetics—part B, vol. 26, No. 1, 26 pages, 1996.

Bundgaard, Mikkel, et al., "Ant Routing System", Technical Report submitted to the IT University of Copenhagen, 2002, 70 pages.

Gunes, Mesut, et al., "ARA—The Ant-Colony Based Routing Algorithm for MANETs", International Workshop on Ad Hoc Networking (IWAHN 2002), Vancouver, British Columbia, Canada, Aug. 2002, 7 pages.

* cited by examiner

TAXONOMY BASED MULTIPLE ANT COLONY OPTIMIZATION APPROACH FOR ROUTING IN MOBILE AD HOC NETWORKS

PRIORITY CLAIM

This application claims the benefit of priority under 35 U.S.C. §119 from India Patent Application No. 1769/DEL/2007, entitled "TAXONOMY BASED MULTIPLE ANT COLONY OPTIMIZATION APPROACH FOR ROUTING IN MOBILE AD HOC NETWORKS," filed by Krishna Y. Kamath on Aug. 20, 2007, the entire contents of which is hereby incorporated by reference for all purposes as if fully set forth herein.

TECHNICAL FIELD

The present disclosure relates generally to network communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Mobile Ad Hoc Networks (MANETs) are communication networks in which all nodes are mobile and communicate with each other via wireless connections. There is no fixed infrastructure with interconnected network infrastructure elements that maintain and exchange routing information. All nodes in a mobile ad hoc network are equal and there are no designated routers: all nodes can route data packets for each other, and data packets are forwarded from node to node in a multi-hop fashion. Due to the mobility of the nodes in a mobile ad hoc network, the topology of the network changes frequently and routes which were initially efficient may quickly become inefficient or even infeasible.

One technique used for routing data packets in mobile ad hoc networks is based on the Ant Colony Optimization (ACO) algorithm, which belongs to a larger field of algorithms referred to as Swarm Intelligence algorithms. A traditional ACO routing technique models the establishing of routes in a network after the mechanisms used by ant colonies to establish and maintain paths to desirable food sources. Ants randomly choose a path to a food source. On the chosen path, the ants deposit a chemical substance called "pheromone", which allows other ants to follow the pheromone scent and hence the chosen path. When more ants traverse a path the pheromone deposit on that path gets more intense, thereby allowing more ants to become attracted to and use that path to travel to the food source and back. The concentration of the pheromone scent on paths to food sources evaporates after certain amount of time. Thus, longer and less traveled paths lose their pheromone scent faster than shorter and more traveled paths. For this reason, more ants would choose the shorter paths to food sources.

The traditional ACO routing technique does not use conventional routing tables that are exchanged between fixed network infrastructure elements. Instead, according to the traditional ACO routing technique a network node selects a route for forwarding a data packet based on a pheromone value associated with that route, where the pheromone value reflects the number of packets that traverse the route. However, the instability of nodes in a mobile ad hoc network limits the applicability of the traditional ACO routing technique because a pheromone value may not be suitable for establishing efficient and stable routes between the nodes in the network.

DETAILED DESCRIPTION

A taxonomy-based approach for routing in mobile ad hoc networks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Functional Overview of an Example Embodiment
3.0 Structural Overview of an Example Operational Context
4.0 Taxonomy of Ant Packets
   4.1 Bandwidth Ant Packets
   4.2 Path Length Ant Packets
   4.3 Contention Ant Packets
   4.4 Reliability Ant Packets
   4.5 Load Ant Packets
   4.6 Communication Cost Ant Packets
5.0 Accumulating Taxonomy-Based Network Metrics
6.0 Computing Route Probability Values
7.0 Forwarding Based on Route Probability Values
8.0 Additional Features and Alternative Embodiments
9.0 Implementation Mechanisms—Hardware Overview
10.0 Extensions and Alternatives

1.0 General Overview

A taxonomy-based multiple ant colony optimization approach for routing in mobile ad hoc networks is described. In an embodiment, an apparatus comprises route management logic encoded in one or more tangible media for execution. The route management logic when executed is operable to send a first plurality of forward-route packets together over a first route to a destination node in a mobile ad hoc network. Each one of the first plurality of forward-route packets is assigned to a different class of a plurality of classes. While traversing the first route to the destination node, a particular forward-route packet accumulates a particular network metric that is associated with a particular class, of the plurality of classes, to which the particular forward-route packet is assigned. The route management logic when executed is operable to receive from the destination node a first plurality of backward-route packets. Each of the first plurality of backward-route packets corresponds to one of the first plurality of forward-route packets. A particular backward-route packet of the first plurality of backward-route packets includes a network metric that is accumulated by the corresponding forward-route packet of the first plurality of forward-route packets. Each network metric that is included in each of the first plurality of backward-route packets is retrieved in a first set of network metrics. Based on the first set of network metrics, computed and stored is a first probability value that is associated with the first route to the destination node.

In this embodiment, the plurality of classes assigned to the forward-route packets sent by the route management logic may comprise classes that are associated with the following network metrics: bandwidth of the communication link(s) to the destination node, path length (e.g. number of hops) to the destination node, Media Access Control (MAC) layer contention on the communication link(s) to the destination node, reliability of the communication link(s) to the destination node; load of the intermediate nodes on the path to the destination node; and communication cost of routing data packets to the destination node.

In a feature of this embodiment, the route management logic may be operable to send different pluralities of forward-route packets and to receive different pluralities of corresponding backward-route packets over different routes to the same destination node. The sets of network metrics accumulated over the different routes to the destination node are then used to compute and store different probability values associated with the different routes to the destination node. In this feature, the apparatus may further comprise a forwarding logic coupled to a plurality of network interfaces that are operable to communicatively connect to a plurality of nodes in the mobile ad hoc network. The forwarding logic when executed is operable to at least: receive a data packet on a first network interface of the plurality of network interfaces; determine that the data packet is destined to the destination node in the mobile ad hoc network; select one of the different routes to the destination node based on the computed probability values associated with the different routes to the destination node; and forward the data packet over the selected route to the destination node on a second network interface of the plurality of network interfaces.

In various features of this embodiment, the route management logic may be configured in a wireless router, in a wireless switch, or in any Internet Protocol (IP)-enabled mobile wireless device such as, for example, a laptop computer, a mobile telephone, an Personal Digital Assistant (PDA). In some embodiments, the route management logic may also be implemented in the routing components of wireless sensor networks that are used in military operations, building automation, healthcare equipments, etc.

Other embodiments comprise one or more computer-readable media encoded with route management logic as described herein and a method for taxonomy-based multiple ant colony optimization routing in mobile ad hoc networks.

2.0 Functional Overview of an Example Embodiment

The techniques described herein provide for taxonomy-based multiple ant colony optimization approach for establishing routes between nodes in mobile ad hoc networks.

As used herein, "node" refers to a device that comprises logic for establishing routes and/or for forwarding packets in a network. The logic may be implemented in a network node as software components, hardware components, or any combination of hardware and software components. For example, in some embodiments the logic for establishing routes and/or for forwarding packets may be implemented as one or more sets of instructions which, when executed by one or more processors, are operable to establish routes and/or to forward traffic to other nodes in the network. In other embodiments, the logic may be implemented as one or more Application-Specific Integrated Circuits (ASICs) that are operable to establish routes and/or to forward packets. In other embodiments, the logic for establishing routes may be implemented as one or more software components and the logic for forwarding packets may be implemented as ASICs, or vice versa.

As used herein, "route" refers to the combination of an address destination, which is usually represented by an address prefix (also referred to as prefix), and path information that describes a path to that address destination. From the perspective of a particular node, the path information of a route may comprise the network address of the next hop node on the path to the address destination of that route. Further, according to the techniques described herein, the path information of a route comprises a probability value that is computed based on a plurality of network metrics, where the plurality of network metrics are accumulated on the route to the address destination by a plurality of forward-route packets that belong to a plurality of packet classes.

As used herein, a "forward-route" packet refers to a control packet that is sent from a source node to a destination node in a mobile ad hoc network for the purpose of establishing a route (and/or metadata information about that route) between the source node and the destination node. According to the techniques described herein, a forward-route packet is assigned to a particular class and is configured to accumulate (or collect) a particular network metric that is associated with that particular class. A forward-route packet may include one or more fields for storing and/or accumulating the network metric; a forward-route packet may or may not include application-level or other data that is transmitted from an application associated with the source node to an application associated with the destination node. As used herein, a "backward-route" packet refers to a control packet that is sent from the destination node back to the source node over the same route that a corresponding forward-route packet has traversed from the source node to the destination node. A backward-route packet stores in one or more fields the network metric that has been accumulated (or collected) by the corresponding forward-route packet on the route from the source node to the destination node. A backward-route packet may or may not include application-level or other data that is transmitted from an application associated with the destination node to an application associated with source node.

In order to establish a route between a source node and a destination node in a mobile ad hoc network, the techniques described herein provide for sending a plurality of forward-route packets as a group from the source node to the destination node, where each one of the plurality of forward-route packets is assigned to a different class of a plurality of classes that are associated with different network metrics. While traversing the route from the source node to the destination node, each one of the forward-route packets accumulates a different metric. When the plurality of forward-route packets reach the destination node, the destination node generates a plurality of backward-route packets where each one of the plurality of backward-route packets corresponds to a different one of the plurality of forward-route packets and stores the network metric accumulated in that forward-route packet. The destination node sends the plurality of backward-route packets to the source node over the same route traversed by the plurality of forward-route packets. The source node receives the plurality of backward-route packets, retrieves the network metrics stored therein, and based on all of the retrieved metrics computes and stores a probability value that is associated with the route between the source node and the destination node. As used herein, "probability value" refers to a value which is associated with a particular route and which indicates the measure of the likelihood that a packet sent over that route would reach the desired destination.

In addition, according to the techniques described herein, a source node may send to the destination node multiple different pluralities of forward-route packets over multiple different routes. The source node would then receive, via multiple pluralities of backward-route packets, multiple sets of network metrics and, based on the multiple sets of network metrics, would compute a different probability value that is associated with each of the different routes between the source node and the destination node. Based on the different probability values, the source node would be able to select a route to the destination node that is deemed more efficient (e.g. less congested) and more stable than the other routes when the source node has to forward data packets to the destination node. In this manner, the techniques described herein provide for routing packets in a mobile ad hoc network based on multiple network metrics that are collected for ant packets of different types. According to the techniques described herein, the multiple network metrics collectively reflect the conditions in the network more accurately than a pheromone value utilized in the traditional ACO routing technique that is generated by a single type of ant packet.

Figure 1:
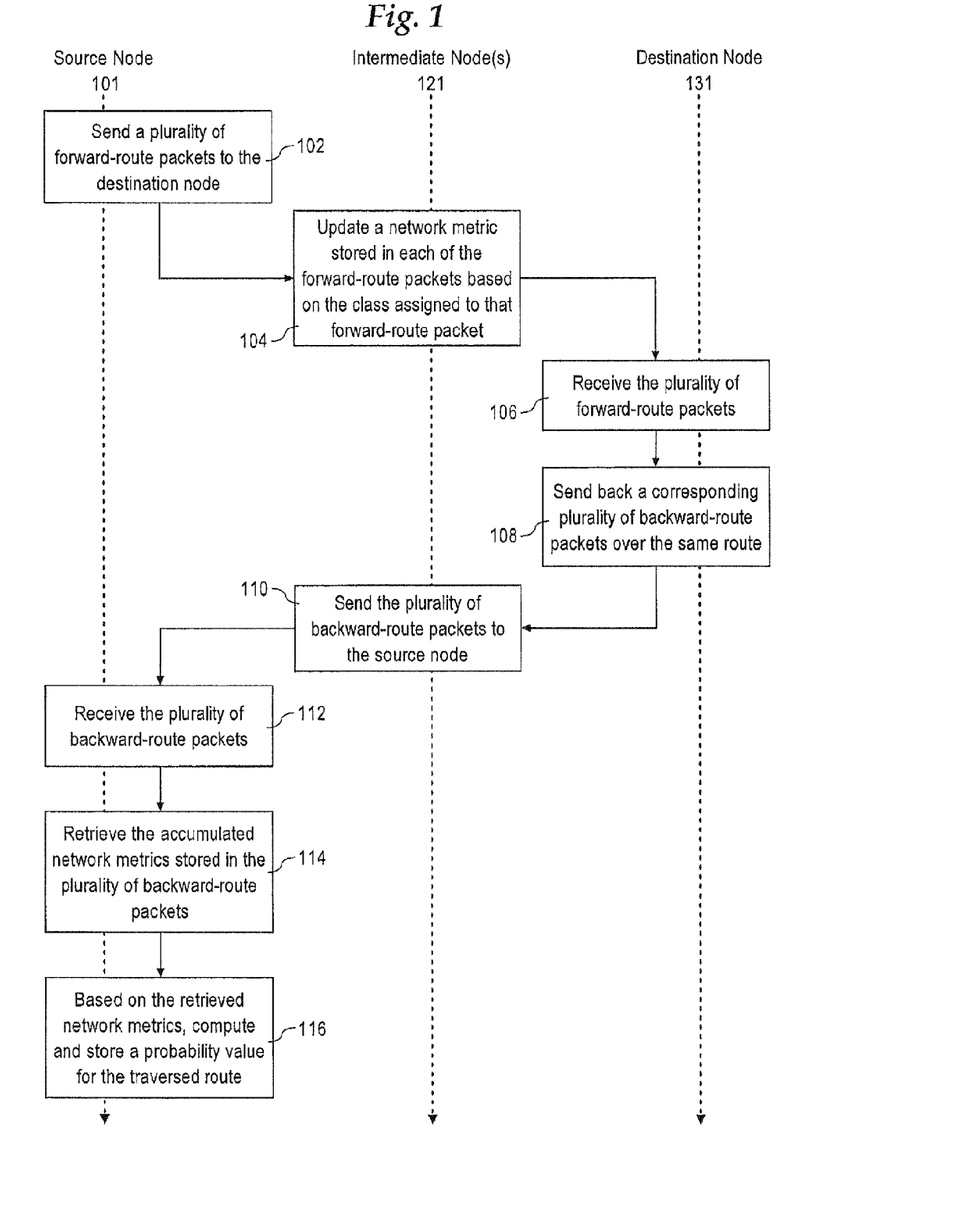
FIG. 1 illustrates an example method for establishing and maintaining routes in a mobile ad hoc network according to one embodiment.

FIG. 1 illustrates an example method for establishing and maintaining routes in a mobile ad hoc network according to one embodiment.

In step 102, source node 101 sends a plurality of forward-route packets as a group to destination node 131 over a particular route that passes through one or more intermediate nodes 121. In some embodiments, a source node may send the multiple forward-route packets simultaneously or one after the other without any delay. In other embodiments, a source node may send the multiple forward-route packets within a certain time period, where the certain time period is such that the multiple network metrics accumulated by the multiple forward-route packets are likely to reflect the same or substantially the same network conditions. According to the techniques described herein, each one of the plurality of forward-route packets is assigned to a different class of a plurality of classes. For example, the plurality of forward-route packets may include two or more forward-packets that are configured to accumulate network metrics associated with any one of the following plurality of classes: network bandwidth class, a network path length class, a network contention class, network reliability class, network load class, and network communication class.

In step 104, each of the intermediate nodes 121 receives the plurality of forward-route packets, determines the particular class to which each forward-route packet is assigned, and updates the corresponding network metric that is being accumulated in that packet. For example, an intermediate node may determine that a forward-route packet is assigned to the network bandwidth class, may determine the network bandwidth of the communication link on which the forward-route packet arrived, and may update the network metric stored in the packet accordingly. After updating the network metrics in the plurality of forward-route packets, each of the intermediate nodes sends the plurality of packets along the route to destination node 131. (It is noted that step 104 would be performed at each intermediate node 121 if there is more than one intermediate node on the route to destination node 131.)

In step 106, destination node 131 receives the plurality of forward-route packets. Destination node 131 inspects the packets and, if necessary, updates any network metrics accumulated therein in the same or similar manner as the manner in which updates are performed by intermediate node(s) 121. Destination node 131 then generates a plurality of backward-route packets, where each of the plurality of backward-route packets corresponds to a different one of the plurality of forward-route packets. A backward-route packet stores, in one or more fields, the network metric that has been accumulated by the corresponding forward-route packet.

In step 108, destination node 131 sends back to source node 101 the plurality of backward-route packets over the same route traversed by the forward route packets. In step 110, the one or more intermediate nodes 121 receive the plurality of backward-route packets and send these packets to source node 101.

In step 112, source node 101 receives the plurality of backward-route packets. Source node 101 then retrieves the accumulated network metrics from each the plurality of backward-route packets in step 114.

Based on all of the retrieved network metrics, in step 116 source node 101 computes a probability value that is associated with the route traversed by the plurality of backward-route packets (and by the plurality of forward-route packets) between source node 101 and destination node 131. Source node 101 then stores the probability value in association with an identifier of the traversed route in a data structure such as, for example, a probability value table.

According to the techniques described herein, source node 101 may repeat the steps of the method illustrated in FIG. 1 for multiple routes that may exist to destination node 131 and may, in a similar manner, compute and store a probability value for each of the multiple routes. In addition, source node 101 may periodically send pluralities of forward-route packets over all known routes to destination node 131 in order to maintain current the data structure that stores the probability values for the routes.

Source node 101 may then use the stored probability values for the routes to destination node 131 when the source node needs to route a data packet to the destination node. For example, source node 101 may select based on the probability values associated with the routes to destination node 131 that one route which the source node deems most stable and/or efficient.

While the method of FIG. 1 illustrates how a source node in a mobile ad-hoc network may build and maintain routes to a single destination node, the techniques described herein are not so limited. Rather, by using the techniques described herein, a source node may build probability value tables for any number of destination nodes. Thus, the example provided in FIG. 1 is to be regarded in an illustrative rather than a restrictive sense.

3.0 Structural Overview of an Example Operational Context

Figure 2:
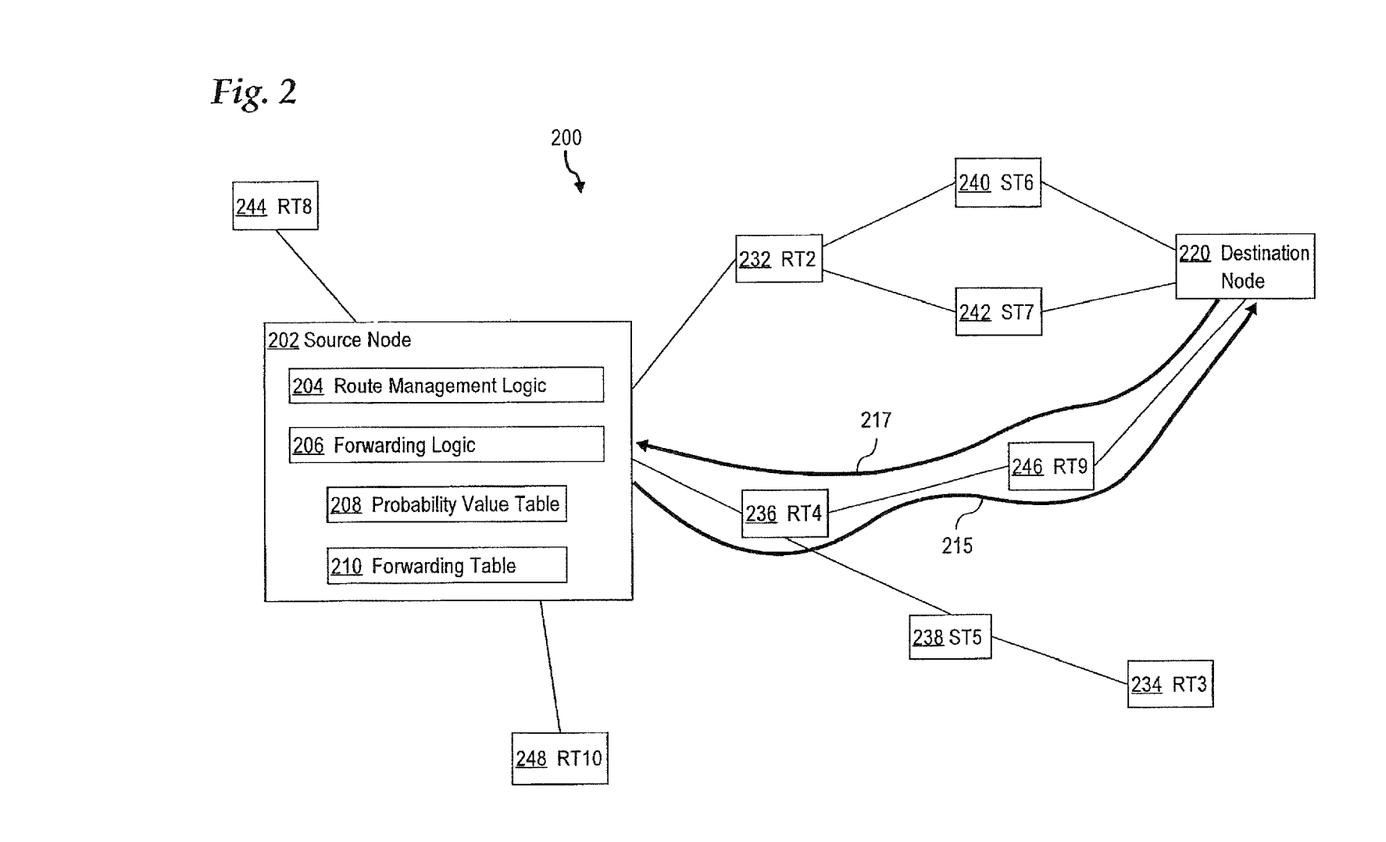
FIG. 2 illustrates an example operational context in a mobile ad hoc network according to one embodiment.

FIG. 2 illustrates an example operational context in a mobile ad hoc network according to one embodiment. At a particular point in time, in mobile ad hoc network 200 source node 202 and destination node 220 are communicatively connected to a number of nodes such as, for example, node 232 (wireless router "RT2"), node 234 (wireless router "RT3"), node 236 (wireless router "RT4"), node 238 (wireless switch "ST5"), node 240 (wireless switch "ST6") node 242 (wireless switch "ST7"), node 244 (wireless router "RT8"), node 246 (wireless router "RT9"), and node 248 (wireless router "RT10"). For illustration purposes, the nodes in mobile ad hoc network 200 are described as wireless routers or wireless switches. However, it is noted that the techniques described herein may be implemented in operational contexts in which the nodes may be any types of IP-enabled mobile devices such as, for example, laptop computers, mobile telephones, and/or PDAs.

In FIG. 2, source node 202 is a wireless router that comprises route management logic 204, forwarding logic 206, probability value table 208, and forwarding table 210. Source node 202 may further comprise other components that are not shown in FIG. 2 such as, for example, an Operating System (OS) and a plurality of network interfaces on which packets may be forwarded. Depending on the architecture of source node 202, in some embodiments route management logic 204 and forwarding logic 206 may be implemented as one or more software and/or hardware components that may operate under the control of a router OS. In other embodiments, route management logic 204 and forwarding logic 206 may be implemented on a blade that is operatively coupled to the backplane of source node 202. In various embodiments, route management logic 204 and forwarding logic 206 may be implemented as one or more software components that are executable by one or more processors, as one or more hardware components such as ASICs, or as any combination of one or more software and hardware components.

Route management logic 204 is operable to establish and maintain routes to the other nodes in mobile ad hoc network 200. According to the techniques described herein, route management logic 204 is operable to send multiple pluralities of forward-route packets to the other nodes over multiple routes, where each one of a plurality of forward-route packets is assigned to a different class of a plurality of classes. Route management logic 204 is operable to send a particular plurality of forward-route packets as a group to a destination node over a particular route. In response to the particular plurality of forward-route packets, route management logic 204 is operable to receive a plurality of backward-route packets. Route management logic 204 is also operable to retrieve the accumulated network metrics stored in the plurality of backward-route packets, and to use all of the retrieved metrics to compute a probability value that is associated with the particular route traversed by the particular plurality of forward-route packets. Route management logic 204 is also operable to store a computed probability value in probability value table 208.

Probability value table 208 is data structure that is operable to store probability values in association with identifiers of the routes maintained by route management logic 204. Probability value table 208 may be physically stored in any volatile and/or non-volatile computer-readable medium. For example, in some embodiments probability value table 208 may be implemented as a table with records, where each record may include one or more fields for storing a route identifier (such as, for example, an address for a destination node, and the address of a next hop router through which that destination node may be reached) and a field for storing a probability value computed for the route identified by the route identifier fields. In other embodiments, probability value table 208 may be implemented as trie structure that is searchable based on an identifier of a route to determine the probability value computed by route management logic 204 for that route. Thus, the techniques described herein are not limited to storing probability values in any particular type of data structure, and for this reason the examples of probability value tables described herein are to be regarded in an illustrative rather than a restrictive sense.

Forwarding logic 206 is operable to forward data and control packets to other nodes in the mobile ad hoc network based on the probability values stored in probability value table 208.

For example, forwarding logic 206 may be operable to inspect data packets received at source node 202. Forwarding logic 206 may look up information from a received data packet (e.g., a destination address, a source address, etc.) into forwarding table 210 in order to determine the network address of the destination node in the mobile ad hoc network to which the received data packet is to be sent. Based on the network address of the destination node and on the probability values stored in probability value table 208, forwarding logic 206 may then select a route over which to send the data packet to the destination node. For example, forwarding logic 206 may select that route from probability value table 208 which is associated with the highest probability value, thus increasing the likelihood that the data packet would reach the destination node.

In operation, suppose that source node 202 needs to establish and maintain routes to destination node 220. Route management logic 204 sends plurality of forward-route packets 215 as a group to destination node 220 over the route passing through nodes 236 and 246. Each one of plurality of forward-route packets 215 is assigned to a different class of a plurality of classes. Each forward-route packet is configured to accumulate a network metric that is associated with the class to which that packet is assigned. For example, plurality of forward-route packets 215 may include six packets: one forward-route packet to accumulate the bandwidth of the communication links to destination node 220, one forward-route packet to accumulate the path length (e.g. number of hops) to destination node 220, one forward-route packet to accumulate MAC-layer contention on the communication links to destination node 220, one forward-route packet to accumulate the reliability of the communication link to destination node 220, one forward-route packet to accumulate the load experienced by the intermediate nodes (i.e. nodes 236 and 246) on the path to destination node 220, and one forward-route packet to accumulate the communication cost of routing data packets to destination node 220.

Node 236 receives plurality of forward-route packets 215, determines the class assigned to each particular forward-route packet, measures the necessary metric values, and updates the network metric stored in each forward-route packet accordingly. Node 236 then forwards plurality of forward-route packets 215 to node 246.

Node 246 receives plurality of forward-route packets 215, determines the class assigned to each particular forward-route packet, measures the necessary metric values, and updates the network metric stored in each forward-route packet accordingly. Node 246 then forwards plurality of forward-route packets 215 to destination node 220.

Destination node 220 receives plurality of forward-route packets 215, determines the class assigned to each particular forward-route packet, measures the necessary metric values, and updates the network metric stored in each forward-route packet accordingly. Thereafter, destination node 220 determines that it is the destination of plurality of forward-route packets 215. Destination node 220 then generates plurality of backward-route packets 217. For example, in one embodiment destination node 220 may generate plurality of backward-route packets 217 by switching the source and destination addresses in the received plurality of forward-route packets 215. In another embodiment, destination node 220 may generate plurality of backward-route packets 217 by creating a new plurality of packets followed by copying the network metrics accumulated in the received plurality of forward-route packets 215 into the new plurality of packets. Destination node 220 then sends plurality of backward-route packets 217 back to source node 202 through node 246.

Node 246 receives plurality of backward-route packets 217 and forwards them to node 236. Node 236 receives plurality of backward-route packets 217 and forwards them to source node 202.

Source node 202 receives plurality of backward-route packets 217, and route management logic 204 extracts the accumulated network metrics that are stored therein. Based on all of the retrieved network metrics, route management logic 204 computes a probability value associated with the route to destination node 204 that passes through nodes 236 and 246. Route management logic 204 then stores the computed probability value in probability value table 208 in association with the network address of node 236 (which serves as the route identifier of the route to destination node 220 that passes through nodes 236 and 246.)

In a similar manner, route management logic 204 computes and stores probability values for the other route to destination node 220, namely, the route that passes through node 232.

Suppose now that source node 202 receives a data packet that is destined to destination node 220. In one example, source node 202 may receive the data packet from another node such as, for example, node 244. In another example, source node 202 may receive the data packet from an application that is executing on source node 202 itself.

Forwarding logic 206 retrieves the destination address from the data packet, and looks up this destination address in forwarding table 210. Since the data packet is destined to destination node 220, the look up would return the network addresses of the nodes which are at the next hop on the path to destination node 220 (for example, the network addresses of nodes 232 and 236). Forwarding logic 206 uses the returned addresses to look up the probability values associated with these addresses in probability value table 208. Forwarding logic 206 compares the returned probability values, selects the highest probability value, and decides to forward the data packet to the node associated with that highest probability value (for example, node 236).

In this manner, forwarding logic 206 uses the probability values computed by route management logic 204 to forward data packets to destination node 220. Since the probability values stored in probability value table 208 are computed based on multiple network metrics associated with the corresponding routes to destination node 220, forwarding logic 206 is capable of selecting a more stable and less congested route to the destination node than would be possible if the forwarding logic were to make forwarding decisions based on a pheromone value that reflects only the number of packets that traverse a particular route as provided by the traditional ACO approach.

4.0 Taxonomy of Ant Packets

The taxonomy-based technique described herein models a plurality of forward-route packets (and a corresponding plurality of backward-route packets) as a colony of ants, where a forward-route packet (and a backward-route packet) is modeled as an ant that belongs to a particular class of ants. A class of packets that are configured to accumulate a specific network metric is modeled as a class of ants that can perform a specific function within the ant colony. In an embodiment, when there are multiple routes to the same destination, then separate multiple colonies of ants (that represents separate multiple pluralities of forward-route packets) are used to measure the various network metrics of the multiple separate routes to that destination. An embodiment also provides a classification of the ant packets that is based on the type of network metric that the ant packets are configured to accumulate.

According to the techniques described herein, any mechanism may be used to identify the classes assigned to forward-route packets and backward-route packets. For example, in some embodiments, forward-route and backward-route packets may store a class field, where the value stored in the class field of a particular packet indicates the class assigned to that particular packet. The class field may be included in the packet header or, alternatively, in the payload portion of the packet. In some embodiments, the value stored in a class field may be a coded value that identifies a packet class through a pre-determined coding scheme; in other embodiments, the value stored in the class field may be a Type-Length-Value (TLV) value that also provides the description of the packet class. Further, in some embodiments forward-route and backward-route packets may store a type field, where the value stored in the type field of a particular packet indicates whether this packet is a forward-route or a backward-route packet. The techniques described herein are not limited to any particular mechanism for identifying the classes associated with forward-route and backward-route packets, and for this reason the examples provided in this paragraph is to be regarded in an illustrative rather than a restrictive sense.

4.1 Bandwidth Ant Packets

In an embodiment, one class of ant packets provides for accumulating a network bandwidth metric. This class provides a Bandwidth Ant (B-Ant) forward-route packet and a Backward Bandwidth Ant (BB-Ant) backward-route packet.

In some embodiments, these ant packets may use a measure of the traffic in the mobile ad hoc network as an indicator of the bandwidth of the network. One example of a value that may be used as the measure of the traffic is the size of the queue of outbound packets in a particular network node. A B-Ant forward-route packet accumulates the queue sizes of the outbound packet queues at each network node on the path to the destination node. The accumulated value of the queue sizes indicates the traffic delays associated with that path to the destination. When the B-Ant forward-route packet reaches the destination node, the destination node generates a BB-Ant backward-route packet and sends the generated packet back to the source node along the same route. When the source node receives the BB-Ant backward-route packet, the source node retrieves the accumulated value stored in the packet and computes the bandwidth metric according to the equation below:

$$P_B = \frac{1}{Delay_{S,D}}$$

where "$P_B$" is the computed bandwidth metric, and "$Delay_{S,D}$" is the value stored in the BB-Ant backward-route packet that represents the accumulated sum of the queue sizes of the outbound queues at the intermediate nodes on the path to the destination node.

4.2 Path Length Ant Packets

In an embodiment, one class of ant packets provides for accumulating a network path length metric. This class provides a Path Length Ant (P-Ant) forward-route packet and a Backward Hop Count Ant (BP-Ant) backward-route packet.

In some embodiments, these ant packets may use the number of hops between the source node and the destination node as an indicator of the path length of the route between the source node and the destination node. A P-Ant forward-route packet counts and accumulates the number of hops (nodes) between the source node and the destination node. When the P-Ant forward-route packet reaches the destination node, the destination node generates a BP-Ant backward-route packet and sends the generated packet back to the source node along the same route. When the source node receives the BP-Ant backward-route packet, the source node retrieves the accumulated value stored in the packet and computes the path length metric according to the equation below:

$$P_P = \frac{1}{HopCount_{S,D}}$$

where "$P_P$" is the computed path length metric, and "HopCount$_{S,D}$" is the value stored in the BP-Ant backward-route packet that represents the accumulated number of hops on the path from the source node to the destination node.

4.3 Contention Ant Packets

In an embodiment, one class of ant packets provides for accumulating a network contention metric. This class provides a Contention Ant (C-Ant) forward-route packet and a Backward Contention Ant (BC-Ant) backward-route packet.

In some embodiments, these ant packets may use contention information from the MAC layer at each intermediate node as an indicator of the network contention on the route between the source node and the destination node. The contention information may be collected from the 802.11 Distributed Coordination Function (DCF). A C-Ant forward-route packet accumulates the total contention on the communication links between the source node and the destination node. When the C-Ant forward-route packet reaches the destination node, the destination node generates a BC-Ant backward-route packet and sends the generated packet back to the source node along the same route. When the source node receives the BC-Ant backward-route packet, the source node retrieves the accumulated value stored in the packet and computes the contention metric according to the equation below:

$$P_C = \frac{1}{Contention_{S,D}}$$

where "$P_C$" is the computed contention metric, and "Contention$_{S,D}$" is the value stored in the BC-Ant backward-route packet that represents the accumulated total contention on the communication links of the path from the source node to the destination node.

4.4 Reliability Ant Packets

In an embodiment, one class of ant packets provides for accumulating a network reliability metric. This class provides a Reliability Ant (R-Ant) forward-route packet and a Backward Reliability Ant (BR-Ant) backward-route packet.

In some embodiments, these ant packets may use a bit-error rate of each communication link between a source node and a destination node as a measure of the network reliability. Some communication links may go down more often than others. After a network failure, some communication links may be repaired more easily and more quickly than others. In various embodiments, any network reliability factors may be taken into account in the assignment of reliability ratings, which may be arbitrary numeric values assigned to communication links by network administrators.

For example, in one embodiment a reliability value between 1 to 10 may be assigned to each communication link, where 1 indicates most reliable and 10 indicates least reliable. A R-Ant forward-route packet accumulates the total of the reliability values assigned to all communication links between the source node and the destination node. When the R-Ant forward-route packet reaches the destination node, the destination node generates a BR-Ant backward-route packet and sends the generated packet back to the source node along the same route. When the source node receives the BR-Ant backward-route packet, the source node retrieves the accumulated value stored in the packet and computes the reliability metric according to the equation below:

$$P_R = \frac{1}{Reliability_{S,D}}$$

where "$P_R$" is the computed reliability metric, and "Reliability$_{S,D}$" is the value stored in the BR-Ant backward-route packet that represents the accumulated sum of reliability values assigned to the communication links on the path between the source node and the destination node.

4.5 Load Ant Packets

In an embodiment, one class of ant packets provides for accumulating a network load metric. This class provides a Load Ant (L-Ant) forward-route packet and a Backward Load Ant (BL-Ant) backward-route packet.

In various embodiments, these ant packets may use the degree to which a network resource (such as, for example, a router) is busy as a measure of the network load. Network load may be calculated in a variety of ways based on a variety of parameters including, but not limited to, CPU utilization and packets processed per second.

For example, in one embodiment, each intermediate node on the path between a source node and a destination node may associate itself with a load value between 1 and 10, where 1 indicates a very small load and 10 indicates a very heavy load. A L-Ant forward-route packet accumulates the total of the load values associated with the intermediate nodes between the source node and the destination node. When the L-Ant forward-route packet reaches the destination node, the destination node generates a BL-Ant backward-route packet and sends the generated packet back to the source node along the same route. When the source node receives the BL-Ant backward-route packet, the source node retrieves the accumulated value stored in the packet and computes the load metric according to the equation below:

$$P_L = \frac{1}{Load_{S,D}}$$

where "$P_L$" is the computed load metric, and "Load$_{S,D}$" is the value stored in the BL-Ant backward-route packet that represents the accumulated sum of load values associated with the intermediate nodes on the path between the source node and the destination node.

4.6 Communication Cost Ant Packets

In an embodiment, one class of ant packets provides for accumulating a network communication cost metric. This class provides a Communication Cost Ant (M-Ant) forward-route packet and a Backward Communication Cost Ant (BM-Ant) backward-route packet.

In some embodiments, these ant packets may use the incurred communication cost as a network metric based on which to route packets through a network. For example, in some operational contexts, some companies may not care about performance as much as they care about operating expenditures. Thus, although a communication link delay may be longer, the company may prefer to send data packets over their own links rather than through the public communication links (e.g., leased or PSTN lines) that cost money for usage time. A M-Ant forward-route packet accumulates the total cost incurred while the packet traverses a route from a source node to a destination node. When the M-Ant forward-route packet reaches the destination node, the destination node generates a BM-Ant backward-route packet and sends the generated packet back to the source node along the same route. When the source node receives the BM-Ant backward-route packet, the source node retrieves the accumulated value stored in the packet and computes the communication cost metric according to the equation below:

$$P_M = \frac{1}{CommunicationCost_{S,D}}$$

where "$P_M$" is the computed communication cost metric, and "$CommunicationCost_{S,D}$" is the value stored in the BM-Ant backward-route packet that represents the accumulated sum of communication costs incurred on the route between the source node and the destination node.

5.0 Accumulating Taxonomy-Based Network Metrics

Embodiments of the techniques described herein are not limited to any particular mechanism for accumulating or collecting network metrics associated with a particular route in the network.

In some embodiments, as a forward-route packet traverses one or more intermediate nodes between a source node and a destination node in a mobile ad-hoc network, a route management logic in each intermediate node may be operable to determine the particular class assigned to that forward-route packet, to determine the associated network metric, and to store and/or update the determined network metric in one or more fields included in the packet. In this manner, a forward-route packet is capable of accumulating and/or collecting a network metric that reflects the network conditions on the selected route from the source node to the destination node in the mobile ad hoc network.

In some embodiments, a forward-route packet may store a cumulative value that represents the sum of a network metric over the hops of the route traversed by the packet so far. For example, in these embodiments each intermediate node (or a component thereof) through which the forward-route packet passes is operable to: determine the network metric value of the class assigned to the packet for the current hop of the route; add the determined network metric value to the value stored in the packet; and store the result back into the packet. In this manner, these embodiments provide for accumulating a network metric into a forward-route packet as the packet traverses the route to a destination node.

In some embodiments, a forward-route packet may store a separate network metric value in a separate field of the packet for each hop of a route traversed by the packet. For example, a forward-route packet may be configured to store in its payload portion a plurality of TLV-type values. Each TLV value may include an identifier of a hop of the route (e.g. the network address of the current node visited by the packet), the total size of the TLV value, and the value of the network metric associated with that hop of the route. In these embodiments, each intermediate node (or a component thereof) through which the forward-route packet passes is operable to: determine the network metric value of the class assigned to the packet for the current hop of the route; generate a TLV value for that current hop; and store the TLV value into the packet. When the forward-route packet is received by the destination node, the destination node (or a component thereof) may sum the network metric values stored in the payload of the packet, and may return the sum value to the source node in one or more fields included in a corresponding backward-route packet. Alternatively, the destination node may store all TLV values collected in the forward-route packet as they are into a corresponding backward-route packet, and may then return the backward-route packet to the source node. In this manner, these embodiments provide for a more granular collection of network metrics associated with each hop of a route between a source node and a destination node, which in turn allows the source node (and/or the destination node) to more accurately determine the network conditions that exist on that route and/or to determine probability values associated with each separate hop of that route.

In some embodiments, the techniques described herein may be used for IP packets that are routed in a packet-switched mobile ad hoc network that supports an IP network protocol. In other embodiments, the techniques described herein may be used for any type of messages routed in a mobile ad hoc network including, but not limited to, Asynchronous Transfer Mode (ATM) cells that are routed in a network that supports an ATM switching protocol, data frames that are routed in a network that supports Layer 2 switching, and data frames that are routed in a network that supports a Frame Relay switching protocols. Thus, the techniques for routing in mobile ad hoc networks are not limited to any particular type of packets or any particular type of network protocols, and for this reason the examples of packets and protocols provided herein are to be regarded in an illustrative rather than a restrictive sense.

6.0 Computing Route Probability Values

One embodiment provides for computing, based on a plurality of collected network metrics, a probability value associated with a route between a source node and a destination node in the network. According to the techniques described herein, a probability value associated with a particular route indicates a measure of the likelihood that a packet sent over that route would reach the destination node. Further, according to the techniques described herein, a source node may generate and maintain a probability value table that stores probability values associated with multiple routes to each of multiple destination nodes.

In some embodiments, a source node (or a component thereof) may use a probabilistic transition rule to compute a probability value associated with a particular route to a particular destination node based on a set of network metrics that are collected by a plurality of forward-route packets sent to the destination node. One example of such probabilistic transition rule is provided below:

$$Prb_{i,j} = \begin{cases} \dfrac{1}{\sum\limits_{j \in N_i} 1} & \text{if } \chi_i < P_r \\ \dfrac{\gamma_{i,j}^\alpha \eta_{i,j}^\beta}{\sum\limits_{j \in N_i} \eta_{i,j}^\beta} & \text{if } \chi_i \geq P_r \end{cases}$$

where:
 $Prb_{i,j}$=the probability value indicating a measure of the likelihood of taking a node "j" from node "i"
 $\gamma_{i,j}=P_B{}^a \cdot P_P{}^b \cdot P_C{}^c \cdot P_R{}^d \cdot P_L{}^e \cdot P_M{}^f$, where "$P_B$", "$P_P$", "$P_C$", "$P_R$", "$P_L$", and "$P_M$" are the probability values computed for the route's bandwidth metric, path length metric, contention metric, reliability metric, load metric, and communication cost metric, respectively.
 $\eta_{i,j}$=heuristic parameter
 $N_i$=set of nodes surrounding node "i"
 $p_r$=threshold probability constant
 $\chi_i$=probability parameter value reflecting the amount of network metric values that node "i" has collected
and "a", "b", "c", "d", "e", "f", "α", "β" are relative importance parameters.

In some embodiments, the above transition probability rule may be used to compute multiple probability values "$Prb_{i,j}$" based on multiple sets of network metrics collected for multiple routes to the same destination node, where different "a", "b", "c", "d", "e", "f", "α", "β" parameters may be assigned to each of the multiple pluralities of forward-route packets that accumulate or collect the multiple sets of network metrics. In this manner, the taxonomy-based techniques described herein provide for increasing the probability of allowing new or better routes to be established in a mobile ad hoc network, especially in a dynamic network where communication links and mobile nodes frequently change. This in turn results in determining optimal routes to destination nodes, enhancing the adaptive capacity of the mobile ad hoc network, and reducing the chances of stagnation (which may result when data packets are routed over a one or few routes even though better routes may be available in the network).

7.0 Forwarding Based on Route Probability Values

One embodiment provides for routing data packets between a source node and a destination node in a mobile ad hoc network based on probability values that are computed for one or more routes between the source node and the destination node.

In some embodiments, a forwarding component in a mobile ad hoc network node is operable to inspect the data packets received at the node. The forwarding component is operable to retrieve the destination address from the data packet and to look up this address in a forwarding table. This look up would return the network addresses of one or more network nodes which are at the next hop on the paths of one or more routes to the destination address. The forwarding component is then operable to use the returned addresses to look up the probability values associated with these addresses in a probability value table. The forwarding component is then operable to compare the returned probability values, select the highest probability value, and make a decision to forward the data packet to the network node associated with that highest probability value.

To illustrate forwarding based on route probability values, consider a mobile ad hoc network node that stores the information illustrated in Table 1 and Table 2 provided below. Table 1 is sample probability value table that stores probability values, which are associated with different routes in the mobile ad hoc network and which have been computed based on network metrics accumulated or collected by different pluralities of forward-route packets that have been sent on these different routes. Table 2 is a sample forwarding table that may be used by a forwarding component to determine the network addresses of the next hop nodes on routes to a destination address. (For purposes of illustration, Table 1 and Table 2 are represented in tabular form; however, a node may implement probability value tables and forwarding tables as any data structure that can be used to store routing information including, but not limited to, tables, tree data structures, trie data structures, and Ternary Content Addressable Memory (TCAM)).

TABLE 1

Sample Probability Value Table

|  |  |  | Destination Router | | | | | | | | |
|---|---|---|---|---|---|---|---|---|---|---|---|
|  |  |  | RT2 | RT3 | RT4 | RT5 | RT6 | RT7 | RT8 | RT9 | RT10 |
| Next Hop | AC1 | RT2 |  | 0.11 | 0.21 | 0.09 |  | 0.12 |  |  |  |
|  |  | RT3 | 0.11 |  | 0.71 | 0.06 | 0.44 | 0.31 | 0.27 | 0.29 |  |
|  |  | RT4 | 0.21 | 0.71 |  | 0.44 | 0.69 | 0.54 | 0.04 |  |  |
|  | AC2 | RT2 |  | 0.62 | 0.63 | 0.58 |  | 0.81 | 0.76 |  |  |
|  |  | RT3 | 0.84 |  | 0.88 | 0.91 | 0.76 |  |  | 0.97 | 0.90 |
|  |  | RT4 | 0.78 | 0.89 | 0.75 | 0.94 | 0.87 | 0.93 |  |  | 0.88 |

TABLE 2

Sample Forwarding Table

| Destination Network | Destination Router ID | Next Hop |
|---|---|---|
| 66.121.0.0 | 66.121.0.4 (RT3) | Switch (RT3) |
| 69.1.18.0 | 69.1.18.1 (RT4) | Switch (RT4) |
| 34.20.0.0 | 34.20.0.1 (RT7) | Switch (RT7) |
| 10.0.23.0 | 10.0.23.2 (RT6) | Switch (RT6) |

Table 1 illustrates the probability values computed based on two ant colonies of packets—pluralities of forward-route packets "AC1" and "AC2". Each of pluralities of forward-route packets "AC1" and "AC2" has collected network metrics over routes to a destination node that are identified by the nodes with Router IDs "RT2", "RT3", and "R4". Table 2 illustrates a forwarding table that includes the following columns: column "Destination Network" stores prefixes that identify destination networks (e.g. IP address prefix "66.121.0.0" identifies "Network 1" and IP address prefix of "10.0.23.0" identifies "Network 4"); column "Destination Router ID" stores the network address of routers that are configured at the edges of destination networks to receive traffic sent to these networks (e.g. IP address "66.121.0.4" identifies router "RT3" and IP address of "10.0.23.2" identifies router "RT6"); and column "Next Hop" stores indications of the next hop routers that identify routes to destination networks.

As an operational example, suppose that the forwarding component of a node (which stores Table 1 and Table 2) receives a data packet. The forwarding component retrieves the destination IP address from the packet and determines that this IP address is "10.0.23.47". Based on this destination address, the forwarding component determines the destination address prefix of "10.0.23.0" (i.e. the prefix of "Network 4") and looks up this destination address prefix in Table 2. The look up operation returns the IP address "10.0.23.2" of router "RT6" that is configured to receive the network traffic to network "Network 4" and that is the destination node for the received data packet. The next hop node on a route to router "RT6" is determined by the "Switch(RT6)" operation that is indicated in Table 2 in association with the address prefix of network "Network 4". The "Switch(RT6)" operation, when performed, retrieves from Table 1 the probability values for all routes through which destination router "RT6" may be reached, namely the routes identified by the next hop routers "RT3" and "RT4". For example, the "Switch(RT6)" operation would retrieve: the probability values "0.44" and "0.69" that have been computed for routers "RT3" and "RT4", respectively, by the plurality of forward-route packets "AC1"; and the probability values "0.76" and "0.87" that have been computed for routers "RT3" and "RT4", respectively, by the plurality of forward-route packets "AC2". By comparing the retrieved four probability values, the "Switch(RT6)" operation determines that the probability value of "0.87" associated with the route identified by router "RT4" is the highest, and therefore the address of router "RT4" is returned by the operation as the next hop node to which the received data packet is to be sent. In this manner, the forwarding component makes the decision to forward the received data packet to router "RT4". After making the forwarding decision, the forwarding component forwards the received data packet to router "RT4".

8.0 Additional Features and Alternative Embodiments

Embodiments may be implemented on any mobile device that is operable to support packet switching. Examples of such mobile devices include, but are not limited to, wireless routers, wireless switches, mobile telephones (e.g., cell phones, satellite telephones, etc.), PDAs, and laptop computers with wireless network cards.

In some embodiments, the techniques described herein may be implemented in conjunction with other mechanisms and techniques that provide for stagnation avoidance. As used herein, "stagnation" refers to a condition in a mobile ad hoc network which may result when data packets are always routed over a one or a relatively few routes even though more efficient and/or more stable routes may be available in the network.

One example of such stagnation-avoidance technique is the pheromone evaporation technique. The pheromone evaporation technique is usually implemented as a reduction in pheromone, which reduces the amount of pheromone to a percentage of the original amount. This implies that the amount of pheromone removed is proportionate to the (original) amount of pheromone. This means that good paths need to be continually reinforced by ant packets in order to ensure that they retain their pheromone value since they evaporate faster. An example quantitative rule for determining pheromone evaporation is provided by the following equation:

$$\tau_{i,j} = (1-E)\tau_{i,j}$$

where "E" is the evaporation rate.

Another example of such stagnation-avoidance technique is the mutant ant technique. The mutant ant technique is typically used to prevent stagnation by sending forward-route packets over randomly selected routes without regard to any pheromone values or probability values computed for these routes. For example, an ant packet may be randomly selected as a mutant ant. The mutant ant packet would not be sent to traverse a route that is selected based on a probability value or a pheromone value associated with that route. This is expressed in the following equation:

$$Ant = \begin{cases} \text{Mutant } Ant \text{ if } \chi_i < p_r \\ \text{Normal } Ant \text{ if } \chi_i \geq p_r \end{cases}$$

where "$p_r$" is a probability constant.

Another example of such stagnation-avoidance technique is a technique that uses ranges of pheromone values. According to this technique, routes are assigned pheromone values drawn from a range of pheromone values. A minimum pheromone value is set for any route, for example the value of "r" (where "r" is a real value between "0" and "1"). Similarly, a maximum pheromone value is also set, which may be for example "1-r". When the pheromone value associated with a route is changed, the pheromone value is checked to determine whether it is present within the minimum and maximum pheromone values. This ensures that a pheromone value associated with a given route would not decrease to a level that the given route cannot be selected for forwarding and would not increase to a level at which the given route would be selected for forwarding all the time.

9.0 Implementation Mechanisms

Hardware Overview

Figure 3:
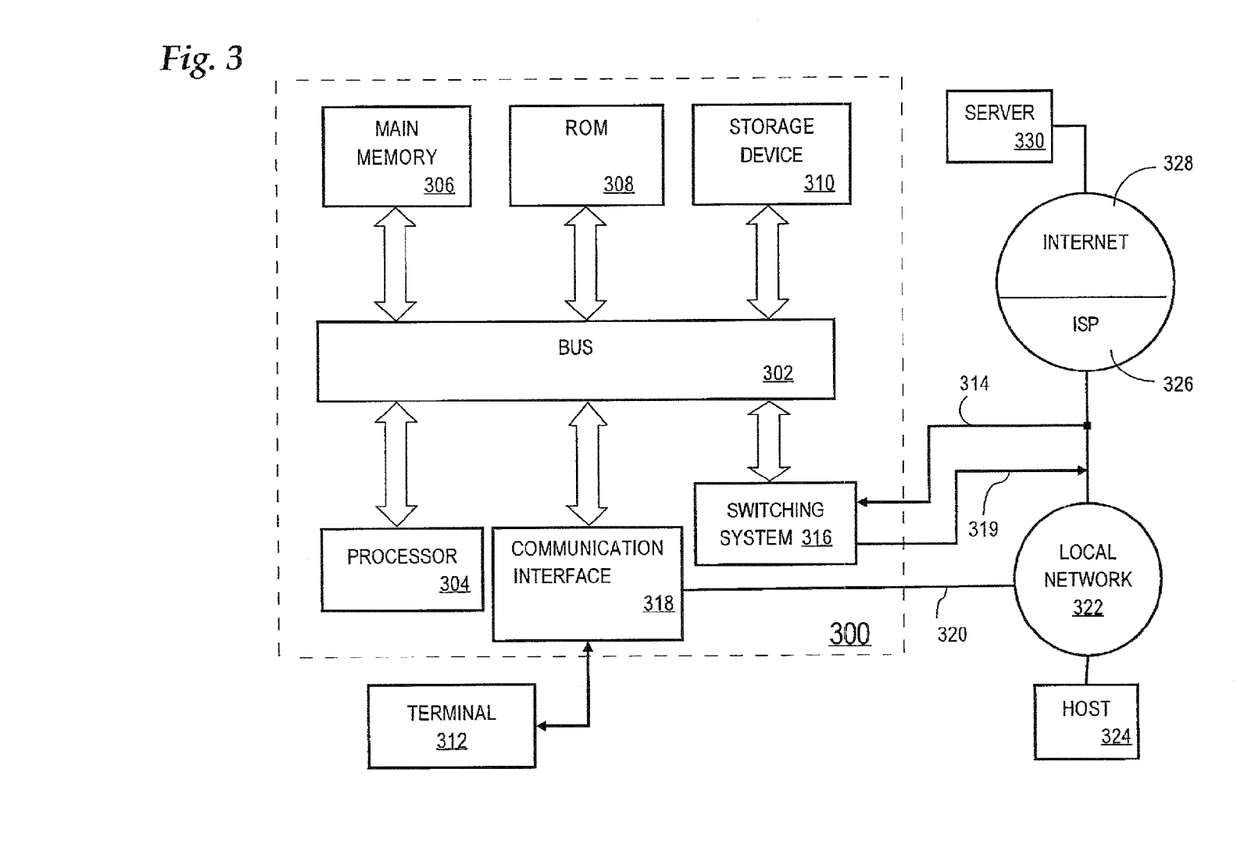
FIG. 3 illustrates a computer system.

FIG. 3 is a block diagram that illustrates a computer system 300 upon which an embodiment of the techniques described herein may be implemented. Example embodiments may be implemented using one or more computer programs and/or one or more ASICs executing on a network device such as a wireless router or a wireless switch. Thus, in one embodiment the computer system 300 is a wireless router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-422 interface. An external terminal 312 or other computer system connects to the computer system 300 and provides commands to it using the interface 314. Firmware or software running in the computer system 300 provides a terminal interface or character-based command interface so that external commands can be given to the computer system.

A switching system 316 is coupled to bus 302 and comprises an input interface 314 and an output interface 319 to one or more external network elements. Input interface 314 and/or output interface 319 may be operable to connect to, and communicate with, the one or more external network elements over a wireless transmission media. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The invention is related to the use of computer system 300 for taxonomy-based multiple ant colony optimization routing in mobile ad hoc networks. According to one embodiment, routing in mobile ad hoc networks is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for routing in mobile ad hoc networks as described herein.

The received code may be executed by processor 304 as it is received, and/or stored in storage device 310, or other non-volatile storage for later execution. In this manner, computer system 300 may obtain application code in the form of a carrier wave.

<p style="text-align:center">10.0 Extensions and Alternatives</p>

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
   one or more processors; and
   route management logic encoded in one or more tangible media for execution and when executed operable to:
   send a first plurality of forward-route packets over a first route to a destination node in a mobile ad hoc network;
   wherein each one of the first plurality of forward-route packets is assigned to a different class of a plurality of classes;
   wherein, while traversing the first route to the destination node, a particular forward-route packet of the first plurality of forward-route packets accumulates a particular network metric that is associated with a particular class, of the plurality of classes, to which the particular forward-route packet is assigned;
   receive, from the destination node, a first plurality of backward-route packets wherein each of the first plurality of backward-route packets corresponds to one of the first plurality of forward-route packets;
   wherein a particular backward-route packet of the first plurality of backward-route packets includes a network metric that is accumulated by a corresponding forward-route packet of the first plurality of forward-route packets;
   retrieve, in a first set of network metrics, each network metric that is included in each of the first plurality of backward-route packets; and
   based on the first set of network metrics, compute and store a first probability value that is associated with the first route to the destination node.

2. The apparatus of claim 1, wherein the route management logic further is operable to:
   send a second plurality of forward-route packets over a second route to the destination node in the mobile ad hoc network;
   wherein each one of the second plurality of forward-route packets is assigned to a different class of the plurality of classes;
   wherein, while traversing the second route to the destination node, a particular forward-route packet of the second plurality of forward-route packets accumulates the particular network metric that is associated with the particular class, of the plurality of classes, to which the particular forward-route packet is assigned;
   receive, from the destination node, a second plurality of backward-route packets wherein each of the second plurality of backward-route packets corresponds to one of the second plurality of forward-route packets;
   wherein a particular backward-route packet of the second plurality of backward-route packets includes the network metric that is accumulated by a corresponding forward-route packet of the second plurality of forward-route packets;
   retrieve, in a second set of network metrics, each network metric that is included in each of the second plurality of backward-route packets; and
   based on the second set of network metrics, compute and store a second probability value that is associated with the second route to the destination node.

3. The apparatus of claim 2, further comprising:
   a plurality of network interfaces that are operable to communicatively connect to a plurality of nodes in the mobile ad hoc network; and
   forwarding logic coupled to the plurality of network interfaces and when executed operable to:
   receive a data packet on a first network interface of the plurality of network interfaces;
   determine that the data packet is destined to the destination node in the mobile ad hoc network;
   based on the first probability value and the second probability value, select one of the first route and the second route to the destination node; and
   forward the data packet over the selected route to the destination node on a second network interface of the plurality of network interfaces.

4. The apparatus of claim 1, wherein the route management logic further is operable to:
   receive, from another node, a specific forward-route packet that is destined to a specific destination;
   determine a specific class, of the plurality of classes, that is assigned to the specific forward-route packet;
   update a specific network metric, associated with the specific class, that is stored in the specific forward-route packet; and
   cause the specific forward-route packet to be sent to the specific destination.

5. The apparatus of claim 1, wherein the first plurality of forward-route packets includes a forward-route packet that is configured to accumulate a bandwidth metric which is associated with a network bandwidth class of the plurality of classes.

6. The apparatus of claim 1, wherein the first plurality of forward-route packets includes a forward-route packet that is configured to accumulate a path length metric which is associated with a network path length class of the plurality of classes.

7. The apparatus of claim 1, wherein the first plurality of forward-route packets includes a forward-route packet that is configured to accumulate a contention metric which is associated with a network contention class of the plurality of classes.

8. The apparatus of claim 1, wherein the first plurality of forward-route packets includes a forward-route packet that is configured to accumulate a reliability metric which is associated with a network reliability class of the plurality of classes.

9. The apparatus of claim 1, wherein the first plurality of forward-route packets includes a forward-route packet that is configured to accumulate a load metric which is associated with a network load class of the plurality of classes.

10. The apparatus of claim 1, wherein the first plurality of forward-route packets includes a forward-route packet that is configured to accumulate a communication cost metric which is associated with a network communication cost class of the plurality of classes.

11. The apparatus of claim 1 comprising one of a wireless switch and a wireless router in which the route management logic is installed.

12. The apparatus of claim 1 comprising a wireless device in which the route management logic is installed, wherein the wireless device is any one of:
    a laptop computer;
    a mobile telephone;
    a Personal Digital Assistant (PDA); and
    a node in a sensor network.

13. A computer-readable volatile or non-volatile storage medium storing logic which, when executed, is operable to:

send a first plurality of forward-route packets over a first route to a destination node in a mobile ad hoc network;

wherein each one of the first plurality of forward-route packets is assigned to a different class of a plurality of classes;

wherein, while traversing the first route to the destination node, a particular forward-route packet of the first plurality of forward-route packets accumulates a particular network metric that is associated with a particular class, of the plurality of classes, to which the particular forward-route packet is assigned;

receive, from the destination node, a first plurality of backward-route packets wherein each of the first plurality of backward-route packets corresponds to one of the first plurality of forward-route packets;

wherein a particular backward-route packet of the first plurality of backward-route packets includes a network metric that is accumulated by a corresponding forward-route packet of the first plurality of forward-route packets;

retrieve, in a first set of network metrics, each network metric that is included in each of the first plurality of backward-route packets; and based on the first set of network metrics, compute and store a first probability value that is associated with the first route to the destination node.

14. The computer-readable volatile or non-volatile storage medium of claim 13, wherein the logic when executed further is operable to:

send a second plurality of forward-route packets over a second route to the destination node in the mobile ad hoc network;

wherein each one of the second plurality of forward-route packets is assigned to a different class of the plurality of classes;

wherein, while traversing the second route to the destination node, a particular forward-route packet of the second plurality of forward-route packets accumulates the particular network metric that is associated with the particular class, of the plurality of classes, to which the particular forward-route packet is assigned;

receive, from the destination node, a second plurality of backward-route packets wherein each of the second plurality of backward-route packets corresponds to one of the second plurality of forward-route packets;

wherein a particular backward-route packet of the second plurality of backward-route packets includes the network metric that is accumulated by a corresponding forward-route packet of the second plurality of forward-route packets;

retrieve, in a second set of network metrics, each network metric that is included in each of the second plurality of backward-route packets; and based on the second set of network metrics, compute and store a second probability value that is associated with the second route to the destination node.

15. The computer-readable volatile or non-volatile storage medium of claim 14, further comprising forwarding logic coupled to a plurality of network interfaces and when executed operable to:

receive a data packet on a first network interface of the plurality of network interfaces;

determine that the data packet is destined to the destination node in the mobile ad hoc network;

based on the first probability value and the second probability value, select one of the first route and the second route to the destination node; and forward the data packet over the selected route to the destination node on a second network interface of the plurality of network interfaces.

16. The computer-readable volatile or non-volatile storage medium of claim 13, wherein the logic when executed further is operable to:

receive, from another node, a specific forward-route packet that is destined to a specific destination;

determine a specific class, of the plurality of classes, that is assigned to the specific forward-route packet;

update a specific network metric, associated with the specific class, that is stored in the specific forward-route packet; and cause the specific forward-route packet to be sent to the specific destination.

17. The computer-readable volatile or non-volatile storage medium of claim 13, wherein the first plurality of forward-route packets includes a forward-route packet that is configured to accumulate a bandwidth metric which is associated with a network bandwidth class of the plurality of classes.

18. The computer-readable volatile or non-volatile storage medium of claim 13, wherein the first plurality of forward-route packets includes a forward-route packet that is configured to accumulate a path length metric which is associated with a network path length class of the plurality of classes.

19. The computer-readable volatile or non-volatile storage medium of claim 13, wherein the first plurality of forward-route packets includes a forward-route packet that is configured to accumulate a contention metric which is associated with a network contention class of the plurality of classes.

20. The computer-readable volatile or non-volatile storage medium of claim 13, wherein the first plurality of forward-route packets includes a forward-route packet that is configured to accumulate a reliability metric which is associated with a network reliability class of the plurality of classes.

21. The computer-readable volatile or non-volatile storage medium of claim 13, wherein the first plurality of forward-route packets includes a forward-route packet that is configured to accumulate a load metric which is associated with a network load class of the plurality of classes.

22. The computer-readable volatile or non-volatile storage medium of claim 13, wherein the first plurality of forward-route packets includes a forward-route packet that is configured to accumulate a communication cost metric which is associated with a network communication cost class of the plurality of classes.

23. The computer-readable volatile or non-volatile storage medium of claim 13, wherein the logic is installable in any one of a wireless switch and a wireless router.

24. The computer-readable volatile or non-volatile storage medium of claim 13, wherein the logic is installable in a wireless device, wherein the wireless device is any one of:
   a laptop computer;
   a mobile telephone;
   a Personal Digital Assistant (PDA); and
   a node in a sensor network.

25. An apparatus comprising:
   means for sending a first plurality of forward-route packets over a first route to a destination node in a mobile ad hoc network;
   wherein each one of the first plurality of forward-route packets is assigned to a different class of a plurality of classes;
   wherein, while traversing the first route to the destination node, a particular forward-route packet of the first plurality of forward-route packets accumulates a particular network metric that is associated with a particular class, of the plurality of classes, to which the particular forward-route packet is assigned;

means for receiving, from the destination node, a first plurality of backward-route packets wherein each of the first plurality of backward-route packets corresponds to one of the first plurality of forward-route packets;

wherein a particular backward-route packet of the first plurality of backward-route packets includes a network metric that is accumulated by a corresponding forward-route packet of the first plurality of forward-route packets;

means for retrieving, in a first set of network metrics, each network metric that is included in each of the first plurality of backward-route packets; and means for computing and storing, based on the first set of network metrics, a first probability value that is associated with the first route to the destination node.

26. A computer-implemented method for establishing routes in a mobile ad hoc network, the method comprising:

sending a first plurality of forward-route packets over a first route to a destination node in the mobile ad hoc network;

wherein each one of the first plurality of forward-route packets is assigned to a different class of a plurality of classes;

wherein, while traversing the first route to the destination node, a particular forward-route packet of the first plurality of forward-route packets accumulates a particular network metric that is associated with a particular class, of the plurality of classes, to which the particular forward-route packet is assigned;

receiving, from the destination node, a first plurality of backward-route packets wherein each of the first plurality of backward-route packets corresponds to one of the first plurality of forward-route packets;

wherein a particular backward-route packet of the first plurality of backward-route packets includes a network metric that is accumulated by a corresponding forward-route packet of the first plurality of forward-route packets;

retrieving, in a first set of network metrics, each network metric that is included in each of the first plurality of backward-route packets; and based on the first set of network metrics, computing and storing a first probability value that is associated with the first route to the destination node;

wherein the method is performed by one or more devices.

* * * * *